Feb. 5, 1952   R. T. DEWEY   2,584,678
BAIT CASTING DEVICE
Filed May 18, 1949   2 SHEETS—SHEET 1
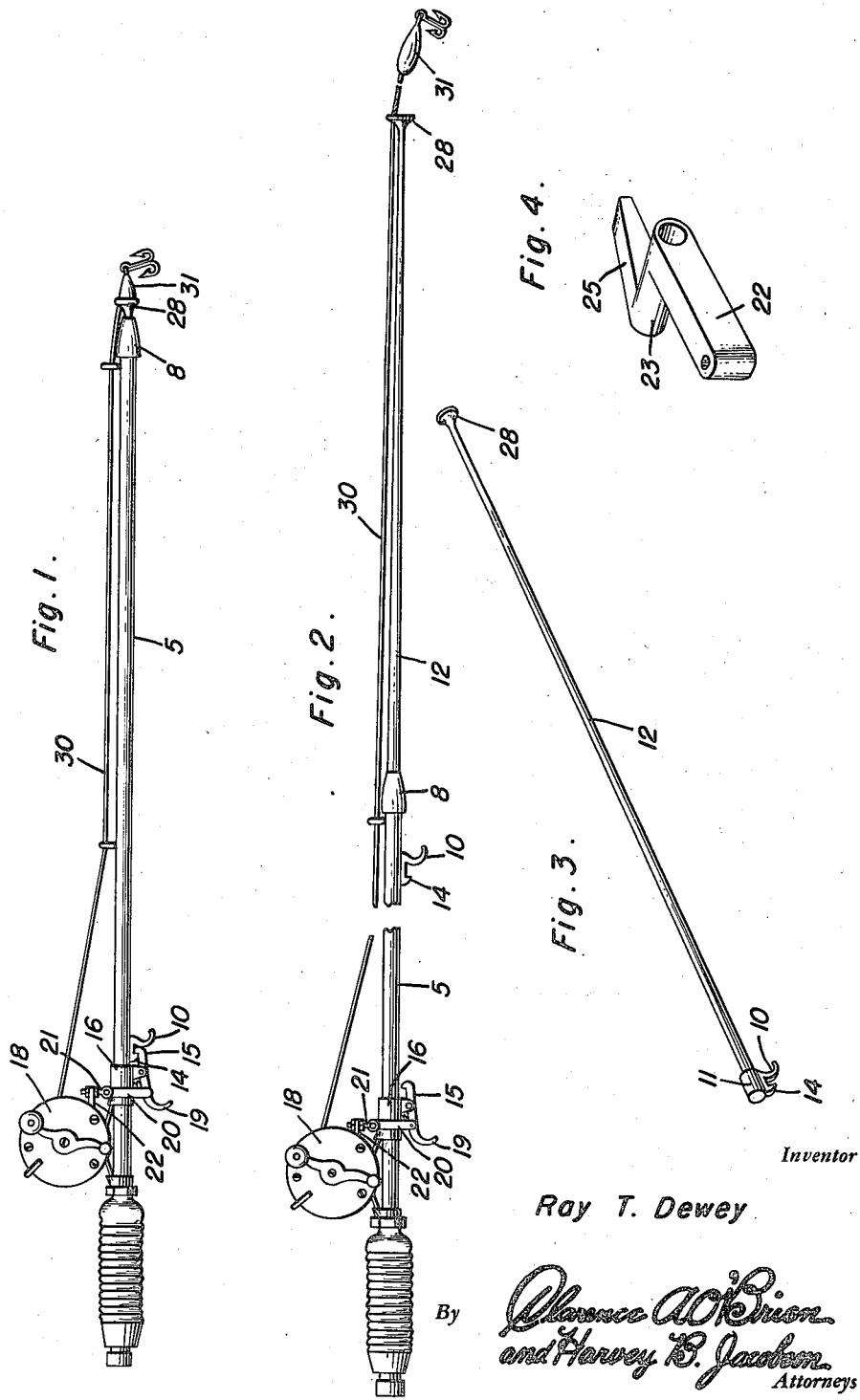
Inventor
Ray T. Dewey
By Clarence A. O'Brien
and Harvey B. Jacobson
Attorneys

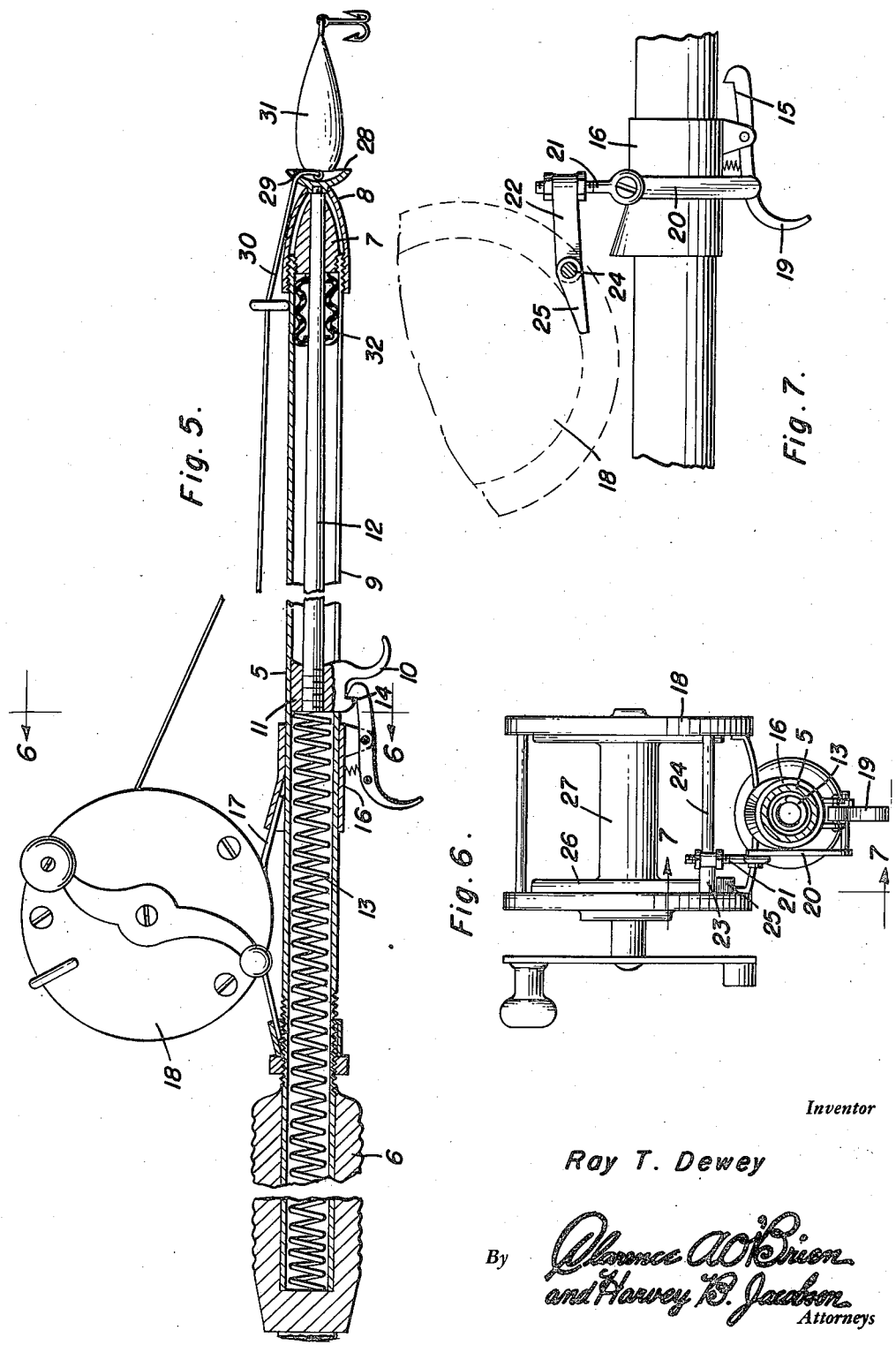

Patented Feb. 5, 1952

2,584,678

UNITED STATES PATENT OFFICE 2,584,678

BAIT CASTING DEVICE

Ray T. Dewey, Watonga, Okla.

Application May 18, 1949, Serial No. 93,955

2 Claims. (Cl. 43—19)

The present invention relates to new and useful improvements in fishing rods and more particularly to mechanical bait casting means carried by the rod.

An important object of the invention is to provide a hollow fishing rod with a spring gun mounted in the rod for casting an artificial bait supported at the outer end of the rod.

A further object of the invention is to provide braking means for a fishing reel mounted on the rod to hold the line taut with the artificial bait positioned against the outer end of the rod when the latter is in position for casting and to provide trigger operated means for releasing the spring gun as well as to release the brake as the line on the reel is paid out.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view showing the artificial bait held against the retracted bait projector in position ready for casting.

Figure 2 is a similar view showing the projector in its forward casting position.

Figure 3 is an enlarged perspective view of the projector rod.

Figure 4 is an enlarged perspective view of the brake for the reel.

Figure 5 is an enlarged longitudinal sectional view of the hollow fishing rod with the spring gun mounted therein.

Figure 6 is a transverse sectional view taken on a line 6—6 of Figure 5, and

Figure 7 is an enlarged fragmentary sectional view taken on a line 7—7 of Figure 6 and showing the brake for the reel.

Referring now to the drawings in detail wherein for the purpose of illustration I have disclosed a preferred embodiment of the invention, the numeral 5 designates a hollow fishing rod constituting a barrel having a handle 6 at its rear end. The forward or outer end of the barrel is closed by a plug 7 threaded therein and over which a cap 8 is secured.

The underside of barrel 5 is formed with a longitudinally extending slot 9 in which a finger engaging hook 10 is slidable, the hook being formed with a collar 11 threaded or otherwise suitably secured to the rear end of a projecting rod 12 which is slidable in plug 7 and cap 8 to move inwardly and outwardly of the barrel. A coil spring 13 is positioned in the rear end of barrel 5 behind collar 11 and is compressed by the collar 11 and rod 12 by pulling the finger gripping hook 10 rearwardly.

The rear portion of hook 10 is formed with a dog 14 engageable by the front end of a catch 15 which is pivoted to a collar 16 suitably secured to the rear portion of barrel 5 and which forms one of the seats for a reel mounting 17 of a fishing reel 18.

The rear end of catch 15 is formed with a trigger 19 and to which one end of a link 20 is pivotally attached, the link extending upwardly at one side of collar 16 with its upper end pivoted to an adjusting screw 21 secured to the outer end of an arm or lever 22 projecting forwardly from a shaft or bushing 23 journaled on one of the transverse bars 24 of reel 18. A brake arm 25 projects rearwardly from shaft 23 for engaging one of the flanges 26 of the reel spool 27.

The front or outer end of projector rod 12 is provided with a concavo-convexed head 28 having an opening 29 therein for receiving the fish line 30 for attaching to a plug or artificial minnow 31. A hollow rubber bumper 32 of substantially pleated formation is suitably secured to the inner end of the plug 7 and through which the rod 12 slides.

In the operation of the device, projector 12 is pulled rearwardly by finger gripping hook 10 to compress spring 13 and which is held in its compressed position by catch 15 engaging dog 14. Line 30 is pulled in by reel 18 to hold artificial bait 31 in seat or cup 28.

The reel is held from unwinding movement by brake arm 25 bearing against flange 26 of reel spool 27, the brake being held in its brake applying position by catch 15 when in locking position with dog 14.

The dog 14 and projector 12 are released by swinging trigger 19 upwardly which swings catch 15 away from the dog and at the same time link 20 is pushed upwardly by the trigger to rock brake arm 25 into its release position from reel spool 27 to permit free running out of the line as the projector 12 moves outwardly by spring 13 to cast the bait 31. Collar 11 of projector 12 strikes rubber bumper 32 to check outward movement of the projector with a minimum of shock to the rod 5.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A fishing rod comprising a hollow barrel, a spring actuated projector slidably mounted in the barrel and having a seat at its outer end for an artificial bait, a collar at the rear end of the projector, a trigger actuated catch carried by the barrel and releasably holding the projector inwardly of the barrel, and a hollow pleated rubber check positioned in the front end of the barrel to receive the impact of the collar for checking outward movement of the projector.

2. A fishing rod comprising a hollow barrel having a longitudinal slot, a spring actuated projector slidably mounted in the barrel and having a seat at its outer end for an artificial bait, a collar at the rear end of the projector, a dog on the collar for sliding in said slot in the barrel, a catch attached to the barrel and engaging the dog and releasably holding the projector in its rearward position in the barrel, a trigger releasing the catch, and a hollow pleated rubber check positioned in the front end of the barrel to receive the impact of the collar for checking outward movement of the projector.

RAY T. DEWEY.

REFERENCES CITED

The following references are of record in the file of this patent:

UNITED STATES PATENTS

| Number | Name | Date |
|---|---|---|
| 764,853 | Kimberlin | July 12, 1904 |
| 1,140,608 | Phillips | May 25, 1915 |
| 1,299,416 | Atwood | Apr. 8, 1919 |
| 2,079,346 | Golden | May 4, 1937 |
| 2,140,875 | Kahler | Dec. 20, 1938 |
| 2,187,807 | Muckey | Jan. 23, 1940 |
| 2,225,719 | Shotten | Dec. 24, 1940 |
| 2,305,176 | Littman | Dec. 15, 1942 |
| 2,390,356 | Dileo | Dec. 4, 1945 |